United States Patent [19]

Grebe et al.

[11] 4,060,394
[45] Nov. 29, 1977

[54] BOTTOM CLOSURE FOR A CHEMICAL REACTOR

[75] Inventors: Herbert Grebe; Wolfgang Hartwig, both of Bremen; Johann Köhler, Barrien; Rudolf Rothe, Bremen; Karl-Friedrich Schröder, Bremen-Lesum, all of Germany

[73] Assignee: HAG Aktiengesellschaft, Bremen, Germany

[21] Appl. No.: 667,949

[22] Filed: Mar. 18, 1976

[30] Foreign Application Priority Data

Mar. 21, 1975 Germany .......................... 2512591

[51] Int. Cl.² ............................. B01J 8/02; B01J 4/00
[52] U.S. Cl. ....................................... 23/284; 23/285; 23/288 R; 23/267 R; 214/17 A
[58] Field of Search ............ 23/288 R, 267 C, 267 R, 23/291, 285, 284; 222/501, 502, 509; 221/209; 214/17 A; 99/289

[56] References Cited

U.S. PATENT DOCUMENTS

| | | | |
|---|---|---|---|
| 1,321,376 | 11/1919 | Jones et al. ................... | 23/288 R X |
| 2,808,319 | 10/1957 | Huff ............................... | 23/288 R X |
| 2,820,702 | 1/1958 | James, Jr. ...................... | 23/288 R |
| 2,898,016 | 8/1959 | Franck et al. ................. | 222/501 |
| 3,288,049 | 11/1966 | Schmid et al. ................ | 99/289 |
| 3,543,814 | 12/1970 | Aluotto .......................... | 222/501 X |
| 3,598,537 | 8/1971 | Kraft .............................. | 23/267 C UX |
| 3,897,220 | 7/1975 | Alcock et al. ................. | 23/288 R |

FOREIGN PATENT DOCUMENTS 6,501,259  8/1966  Netherlands ......................... 23/285

Primary Examiner—Morris O. Wolk
Assistant Examiner—Michael S. Marcus
Attorney, Agent, or Firm—Watson, Leavenworth, Kelton & Taggart

[57] ABSTRACT

A bottom closure for a chemical reactor having a cylinder extension whose attachment opening is closed by a closing part with said closing part bearing upon the conical counter-surface of the attachment opening and protruding a sufficient distance into the interior of the reactor that solid bridges or arches formed from solid material within the reactor are destroyed during the opening of the closure.

6 Claims, 4 Drawing Figures

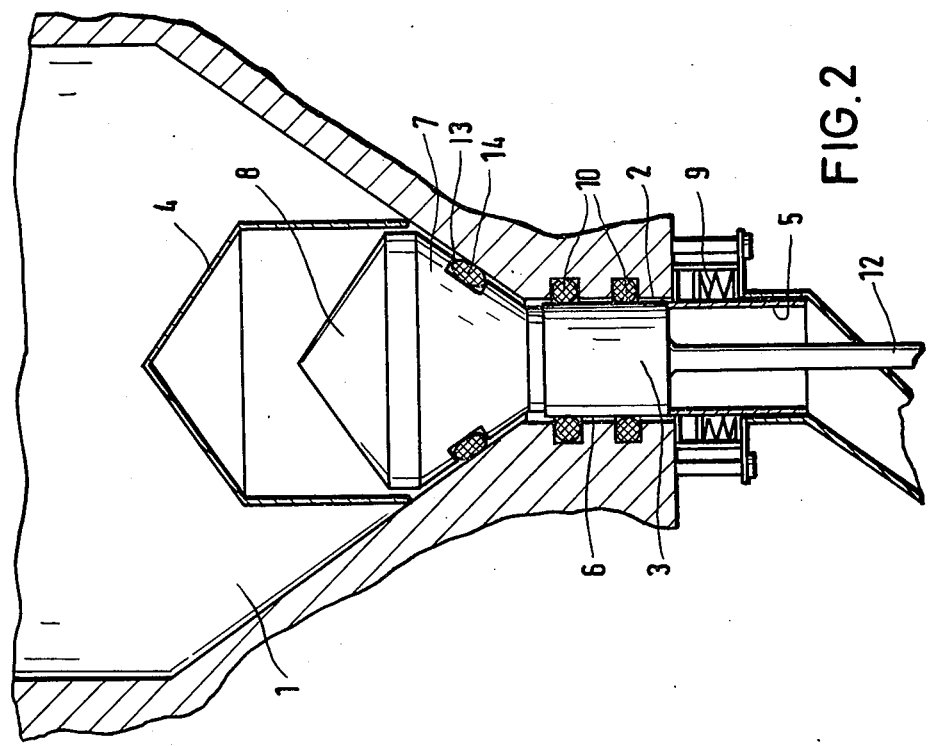
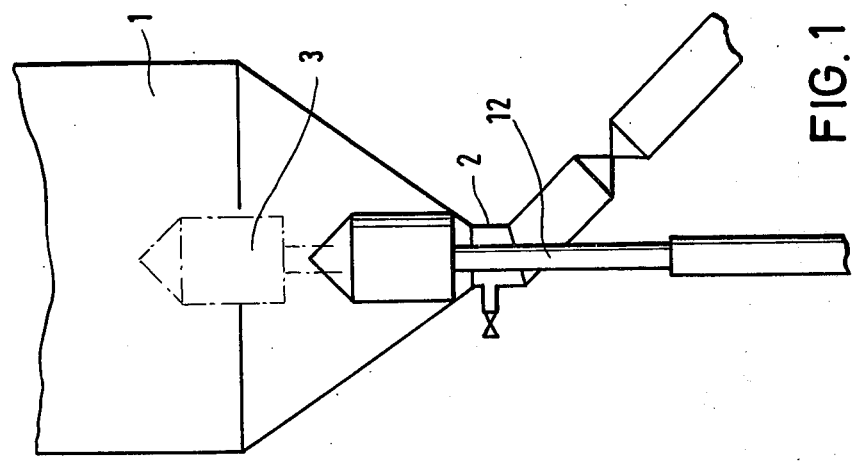

BOTTOM CLOSURE FOR A CHEMICAL REACTOR

BACKGROUND OF THE INVENTION

1. Field of the Invention

This invention relates to chemical reactors, and more particularly, to bottom closures for chemical reactors wherein the attachment opening of a cylinder extension associated with the reactors is closed by a closing part.

2. Description of the Prior Art

Bottom closures of chemical reactors serve to discharge the reactor contents. Such bottom closures can be designed as globe stopcocks, sluices, discharge spirals or rotating cylinders with blind bores. When solids are discharged from a reactor, the solid frequently forms bridges or arches in the interior of the reactor which prevent or impede the discharge. A general drawback of the aforementioned designs for bottom closures is that they do not prevent the formation of such bridges and arches, and do not destroy bridges or arches that have already been formed.

SUMMARY OF THE INVENTION

The invention is based on the problem of providing a bottom closure which destroys on opening any bridges and arches which have been formed by the solid contained in the interior of the reactor. The problem is solved according to the invention in this way: the closing part has a preferably conically tapered lower end, which bears in the closed state upon a conical counter surface formed on the attachment opening of the cylinder extension, and protrudes so far into the interior of the reactor that solid bridges or arches are destroyed when the closure is opened. dr

BRIEF DESCRIPTION OF THE DRAWINGS

FIG. 1 is a longitudinal section illustrating one embodiment of a bottom closure for a chemical reactor according to the invention.

FIG. 2 is a longitudinal section of another embodiment of a bottom closure.

DESCRIPTION OF THE PREFERRED EMBODIMENTS

Figures 3, 4:
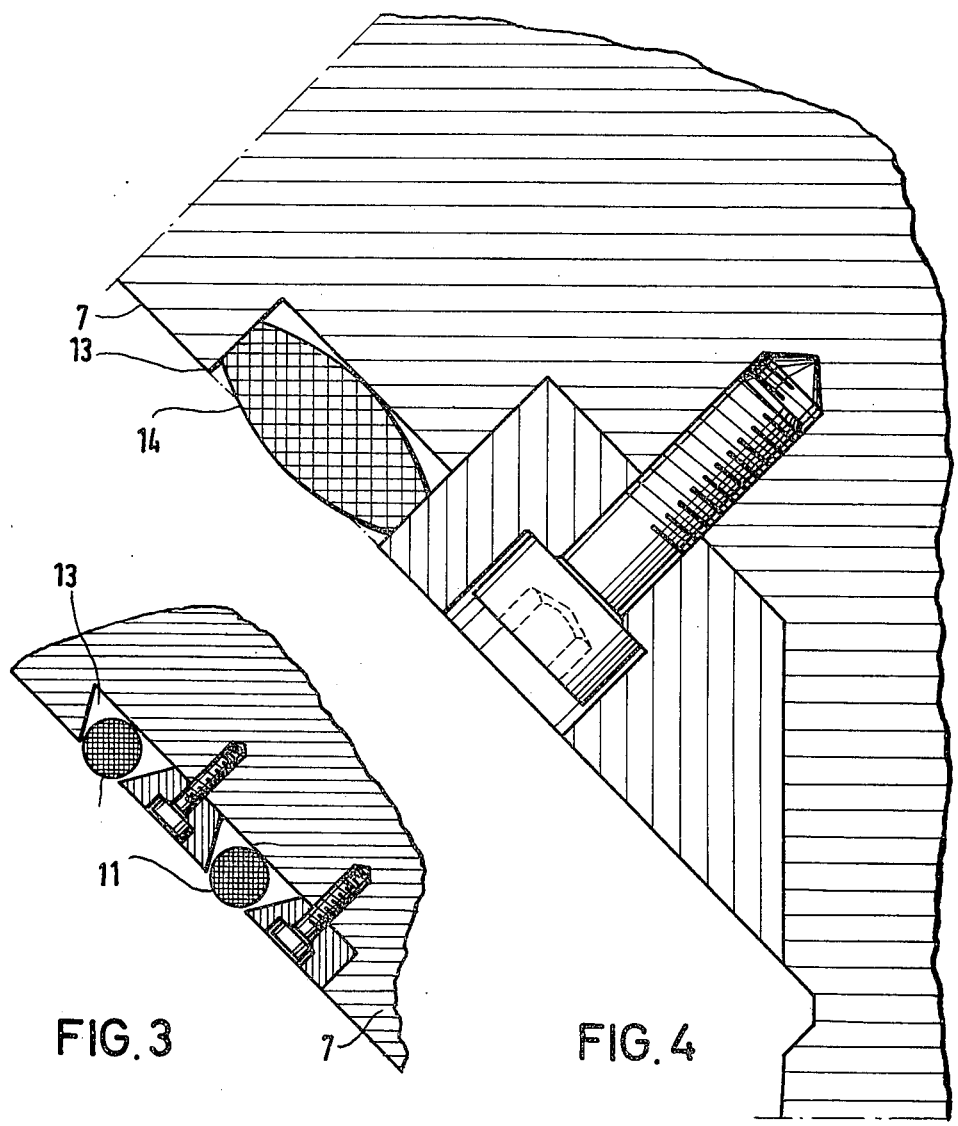
FIGS. 3 and 4 each illustrate in detail sealing means according to another embodiments of the bottom closure of this invention.

The closing part of the bottom closure herein is preferably covered by a cap, a free space being provided between the closing part and the cap so that the cap is only lifted when the packings are outside the range of the issuing solid. The advantage of this embodiment is that, first of all, the cylindrical sealing surfaces on the closing part are already completely covered by the cap before the bottom closure is opened, which prevents it from coming in contact with the issuing product, and second, the cap prevents the further discharge of the solid before the bottom closure is completely closed, so that the complete closing of the closure is not prevented by solid particles between the conical surfaces of the closing part and attachment opening. In this embodiment the closing part has preferably a bottom sealing surface, a central section widening conically upward which bears in the closed position on the conically widening attachement opening of the cylinder extension, and a conical top which engages the cap after the closure has been partly opened.

In another preferred embodiment, the bottom closure contains a protective packing sleeve which is pressed by compression springs etc. from the bottom against the cylindrical, sealing surfaces of the closing part and moved completely during the opening of the closure over O-rings arranged in grooves in the upper straight section of the cylinder extension before the closing part has engaged the cap. In this embodiment, the O-rings provided for sealing do not come directly in contact with the solid, so that they cannot be destroyed by it or impaired in their function.

In another embodiment, the O-rings are arranged in grooves which are provided in the central conical section of the closing part, these grooves narrowing preferably to the outside and thus preventing the O-rings from falling out.

For cleaning the closing part and the surfaces of the closure on which the closing part bears can be provided a means for rinsing the closing part. This rinsing liquid can also be supplied through a line inside the control rod of the closing part and issue through openings in the conical region of the closing part.

Referring now to FIG. 1, reactor 1 has a cylindrical extension 2, a conical surface being provided at the point of transition from the reactor to the cylinder extension on which closing part 3 bears, thus sealing the reactor. Closing part 3 can have a conically tapering bottom end, similar to the tapering section in FIG. 2. The closing part protrudes through a cylindrical extension into the interior of the reactor, approximately up to the level where the straight section of the reactor begins. The cylindrical extension of the closing part is terminated by a top which destroys during its opening any bridges and arches formed by solids within the reactor. The closing part is moved up by control rod 12 for opening the closure, and down for closing.

According to FIG. 2, the closing part can be covered by a cap 4 protruding into the interior of the reactor. In the closed state there is a free space between the closing part and the cap. Only when the closing part is lifted so far that it engages the cap 4 does the discharge of the solid begin. When the bottom closure is closed, the cap already rests on the bottom of the reactor before the downward movement of the closing part 3 is completed. This has for its effect the prevention of adhesion of any solid during the last stage of the closing movement on the sealing surfaces, e.g. the conical section 7 of the closing part and the conical region of the attachment opening of the cylinder extension 2, which adhesion could otherwise prevent complete closing.

In the upper region of cylinder extension 2 are provided circular grooves in which are arranged O-rings. These O-rings are made of a suitable elastic, and possibly reinforced plastic, and ensure complete sealing. In order to prevent these O-rings from being damaged during the discharge of the solid, the protective packing sleeve 5 moves during the opening of the closure from the bottom over the O-rings 10. The protective packing sleeve 5 is urged by compression spring 9 against closing part 3. The sleeve follows the closing part 3 so far that the O-rings are covered. (In FIG. 2 the protective packing sleeves and the compression springs are illustrated to be of shorter length). The distance between the cap and the closing parts in the direction of the closing movement is therefore so great that the cap is only lifted when the protective packing sleeve has moved over the O-rings and the cap has also sealed the cylindrical sealing surface 6 on the closing part. The issuance of the solid thus starts only when the cylindrical sealing surface 6 on the closing part is also covered by the cap in such a way that the solid can not reach it.

According to FIG. 3, grooves 13 can be provided in the central conical region 7 of the closing part, and O-rings are arranged in these grooves. In this embodiment a particularly good seal is achieved. In order to prevent fouling of the O-rings 11, a means for rinsing this region of the closing part is provided, where the rinsing liquid is supplied through a line which opens into the lower region of the reactor and directs through a plurality of openings, jets of a rinsing liquid toward the conical region 7 of the closing part when the closure is opened. The rinsing liquid can also be supplied through a line inside the control rod 12 and issue directly through openings inside the conical section 7. Particularly in bottom closures in extractors which are used for decaffeinating raw coffee, it is important to clean the sealing surfaces and the O-rings by rinsing, otherwise the operation of the closure would be impaired.

Suitable materials for the O-rings are, for example, reinforced or unreinforced polytetrafluoroethylene copolymers of vinylidene fluoride and hexafluoropropylene (respectively, Teflon and Viton, trademarks of du Pont).

The conical section 7 of the closing part can also contain metal sealing ring 14 in divided grooves. This type of seal is shown in FIG. 4.

The gas- and liquid-tight bottom closure is suitable for a pressure of up to 400 bar. If Teflon or Viton are used for the O-rings, the admissible temperature is about 160° C. If metal seals 14 are used, the temperature may rise up to 325° C.

What is claimed is:

1. In a reaction vessel for holding solids and having a lower section including a conical part and a cylindrical outlet extending downwardly from said conical part for discharge of solids for said reaction vessel, and a closure member for closing off said outlet, said closure member having a cylindrical portion and a conical portion, the conical portion seating on said lower section conical part and said cylindrical portion locating in said cylindrical outlet when said closure member is in a closure position, there further being first seal means associated with said closure member and said lower section of the reaction vessel for effecting a seal of said outlet when said closure member is in closure position, said closure member being movable upwardly to an open position in said lower conical section for opening said outlet, the upward movement of said closure member being effective to destroy any bridge of solids as may exist in said lower section adjacent said outlet, the improvement which comprises a cap member loosely received in said lower section conical part in covering position over said closure member and resting on said lower section conical part when said closure member is in a closure position, said closure member during upward movement thereof engaging said cap member for lifting said cap member upwardly in said lower section conical part, and means operable to protect said first seal means from contact with solids when said closure member is moved to an open position, there being sufficient free space provided between said closure member and cap member such that said closure member during upward movement thereof does not engage with said cap member to lift same until said means for protecting said first seal means have become operable.

2. The reaction vessel of claim 1 which said closure member conical portion has a top portion complementally configured with a corresponding top portion of said cap.

3. The reaction vessel of claim 1 in which the first seal means comprises O-rings carried in grooves in said outlet, the means operable for protecting such first seal means comprising a sleeve received in said outlet below said closure member cylindrical portion and aligned therewith, and spring biasing means engaged with said sleeve and operable to move said sleeve in upward following engagement with said closure member cylindrical portion and into covering position over said O-rings.

4. Thr reaction vessel of claim 1 which second seal means are provided and which comprises O-rings carried in grooves formed in said closure member conical portion, said O-rings locating within said cap when said closure member is moved to an open position.

5. The reaction vessel of claim 1 in which second seal means are provided and which comprises rings carried in grooves formed in said closure member conical portion, said rings being of metal, the lower section conical part being of a harder material then the metal of said rings.

6. The reaction vessel of claim 4 in which the grooves carrying said O-rings are outwardly narrowing in dimension thereby to provide positive retention of said O-rings therein.

* * * * *